Dec. 21, 1948.   K. M. FEIERTAG   2,456,934
CASING AND FASTENING MEANS THEREFOR
Filed Aug. 28, 1947

Inventor:
Karl M Feiertag,
by Prowell S Mack
His Attorney.

Patented Dec. 21, 1948

2,456,934

UNITED STATES PATENT OFFICE 2,456,934

CASING AND FASTENING MEANS THEREFOR

Karl M. Feiertag, Lagrange, Ind., assignor to General Electric Company, a corporation of New York Application August 28, 1947, Serial No. 771,019

6 Claims. (Cl. 172—36)

This invention relates to fasteners for securing a cover on a container or casing, and more particularly to such fasteners used for holding together the cover and case of a dynamoelectric machine.

Various means have been employed for fastening a cover on a container or casing including through-bolts, clamps and spring arrangements. In the design of dynamoelectric machines, particularly in the small physical sizes such as are utilized for phonograph and clock drives, it is necessary to firmly secure the core or end plate to the casing in a manner which permits ease of assembly and disassembly and yet occupies the minimum space.

It is the object of this invention to provide an improved means for fastening a cover to a container.

Another object of this invention is to provide an improved fastener for securing together the cover and casing of a dynamoelectric machine.

A further object of this invention is to provide an improved fastener for securing together the cover and casing of a dynamoelectric machine, which fastener facilitates assembly and disassembly and occupies a minimum space.

Further objects and advantages of my invention will become apparent and my invention will be better understood from the following description referring to the accompanying drawing, and the features of novelty which characterize my invention will be pointed out with particularity in the claims annexed to and forming part of this specification.

A feature of this invention is the provision of a resilient fastening member having two lips respectively engaging the casing and the cover and a bowed section which through its spring action forces one of the lips into engagement with an opening in the casing.

Figure 1:
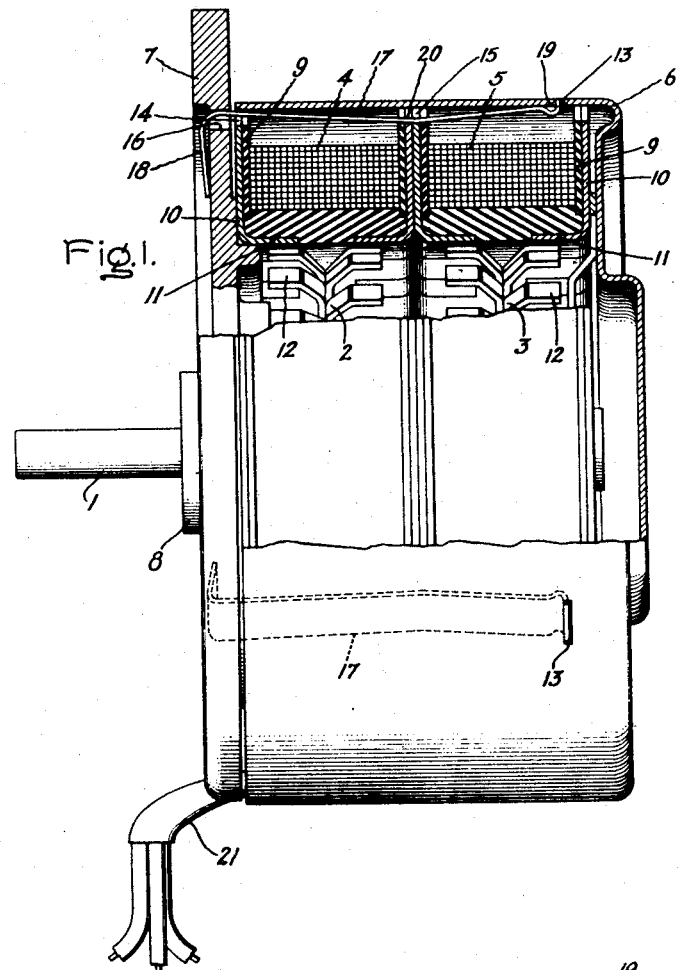
Figure 2:
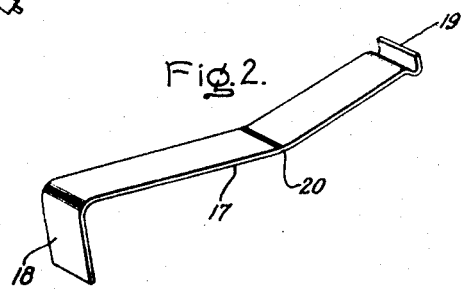

Referring to the drawing, Fig. 1 illustrates a view, partly in section, of a dynamoelectric machine of the type utilized for phonograph drives, which incorporates the improved fastener of this invention. Fig. 2 is a detailed illustration of the improved fastener of Fig. 1.

Referring now to Fig. 1, there is shown a dynamoelectric machine of the type described in the co-pending application, Serial No. 771,073, filed August 28, 1947 of Hugh M. Stephenson and assigned to the assignee of the present invention. Here, the machine is provided with an output shaft 1, rotor elements 2 and 3 and stator coils 4 and 5, which are energized by power connections 21. Surrounding the rotor and stator members is casing member 6 and cover plate 7 is utilized to close the machine and carries bearing 8 for supporting the shaft 1 and rotor elements 2 and 3. Stator coils 4 and 5 are encased in moulded jacket 9 and are provided with annular magnetic side members 10 from which project teeth 11 which cooperate with rotor projections 12 on rotor elements 2 and 3. The operation of this motor is completely described in the aforesaid application, Serial No. 771,073.

In order to securely fasten together the outer casing 6 and cover plate 7, the arrangement now to be described is provided. A plurality of slot openings 13 are provided in the wall of casing member 6. A plurality of grooves 14 and 15 are formed in the outer peripheries of jackets 9 and side members 10. These grooves are in alignment with the openings 13 and in effect provide a plurality of longitudinal grooves formed in the outer periphery of the stationary member which communicate with the openings in the outer casing 6. A plurality of openings 16 are formed in the cover plate 7 which are also in alignment with the grooves 14 and 15 and the holes 13.

Positioned in the grooves in the outer periphery of the stator member are fastening members 17. Referring now to Fig. 2, it will be seen that these members are formed of relatively thin resilient material and have a spring lip 18 and a reverse lip 19 at opposite ends. The central longitudinal portion of the fastener is bowed to form a wide V shape. The lip 18 serves to apply spring pressure on the cover plate 7 and is, therefore, formed at an acute angle with the major longitudinal axis of the fastener 17, as shown in Fig. 1. The fastening members 17 are slightly shorter in their free longitudinal dimension between the two lips than the linear dimension between the openings 13 in the casing and the openings 16 in the cover plate 7. This longitudinal dimension is controllable to predetermine the proper fastening pressure.

In assembling the motor the component parts are assembled in the conventional manner up to the point of clamping. The fastener member 17 is then inserted in the opening 16 of cover plate 7 and is guided by grooves 14 and 15 in the outer periphery of the stator member until reverse lip 19 reaches hole 13 in the case 6. At this point, due to the bowed configuration of the fastener member, the lower surface of the bowed portion 20 bears against the inner surface of the groove 15 causing the fastener to fulcrum at this point thereby slightly elongating the lip to lip dimension and forcing the lip 19 into the hole 13 where it is maintained by spring pressure. At the same time, the lip 18 is stressed and deforms to press the cover 7 firmly against component parts of the motor and the casing 6.

In order to disassemble the cover plate from the casing, the tip of the lip 19 is depressed with a suitable tool to a point below the inner surface of the casing 6. At this point, the stress of the lip 18 forces the fastener in the direction of the cover 7 a sufficient distance to entirely disengage the lip 19 from the opening 13. The fastener can then be easily withdrawn and the disassembly completed.

It will be readily apparent that this construction facilitates the assembly and disassembly of the motor and occupies a minimum of space. In addition, all of the dimensional variations in the component parts are taken up by the spring action of lip 18 and the entire assembly is firmly held together under permanent spring tension. This spring tension may be predetermined and controlled to the extent that the assembly is sufficiently rigid and yet not sufficiently severe to deform the assembled elements.

While this device is shown as utilized to hold together the casting and cover plate of a dynamoelectric machine, it is to be understood that this type of fastener may be applied to hold together the casing and cover of any device having a groove, abutment or projection to provide the necessary fulcrum.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In combination, a casing for a device with a longitudinal groove formed in the outer periphery thereof, said casing having an opening formed in a wall thereof communicating with said groove, a cover for said casing having an opening formed therein in alignment with said groove, and a fastening member for securing said cover to said casing, said member being adapted to be inserted in said groove through said cover opening and having a lip formed at one end and a reverse lip formed at the other end thereof, said member being bowed in its longitudinal dimension whereby on insertion in said groove said reverse lip is forced into said casing opening and said first named lip maintains said cover securely in place.

2. In combination, a casing for a device with a longitudinal groove formed in the outer periphery thereof, said casing having an opening formed in a wall thereof communicating with said groove, a cover for said casing having an opening formed therein in alignment with said groove and a fastening member formed of relatively thin resilient material for securing said cover to said casing and having a lip formed at one end and a reverse lip formed at the other end thereof, said member being adapted to be inserted in said groove through said cover opening and having its longitudinal dimension bowed so as to bear on the inner surface of said groove whereby on insertion in said groove said reverse lip is forced to said casing opening and said first named lip maintains said cover securely in place.

3. In combination, a casing for a device with a longitudinal groove formed in the outer periphery thereof, said casing having an opening formed in a wall thereof communicating with said groove, a cover for said casing having an opening formed therein in alignment with said groove, and a resilient fastening member for securing said cover to said container, said member being adapted to be inserted in said groove through said cover opening and having a lip formed at one end and a reverse lip formed at the other end thereof, said first named lip being adapted to apply spring pressure on said cover, said member being bowed in its longitudinal dimension, the bowed portion of said member bearing on the inner surface of said groove whereby on insertion in said groove said reverse lip is forced into said casing opening and said first named lip maintains said cover securely in place.

4. In combination, a container having an opening formed in a wall thereof, a partition in said container having an opening formed in its outer periphery adjacent said wall, a cover for said container having an opening formed therein in alignment with said partition opening, a resilient fastening member for securing said cover to said container, said member being adapted to be inserted through the openings in said cover and said partition and having a lip formed at one end and a reverse lip formed at the other end thereof, said first named lip being adapted to apply spring pressure on said cover, said member being bowed in its longitudinal dimension, said bowed member bearing on the inner surface of the opening in said partition whereby on insertion of said member in said openings said reverse lip is forced into said container opening and said first named lip maintains said cover securely in place.

5. In combination, a casing for a device with a plurality of longitudinal grooves formed in the outer periphery thereof, said casing having openings formed therein communicating with said grooves, a cover for said casing having a plurality of openings in alignment with said grooves, and resilient fastening members for securing said cover to said casing and adapted to be inserted through the openings in said cover into said grooves, said members having a lip formed at one end adapted to apply spring pressure on said cover and a reverse lip formed at the other end thereof, said members being bowed in their longitudinal dimension, said bowed portions of said members bearing on the inner surfaces of said grooves whereby the spring pressure of said bowed portions against said grooves forces said reverse lips into said casing openings and said first named lips maintain said cover securely in place.

6. In combination, a shell for the stationary member of a dynamoelectric machine having a plurality of longitudinal grooves formed therein, said shell having openings formed therein communicating with said grooves, a cover for said shell having a plurality of openings formed therein in alignment with said grooves, and resilient fastening members for securing said cover to said shell and adapted to be inserted through the openings in said cover into said grooves, said members having a lip formed at one end for applying spring pressure on said cover and a reverse lip formed at the other end thereof, said members being bowed in their longitudinal dimension and being shorter in their free longitudinal dimension between said lips than the linear dimension between the openings in said cover and the openings in said shell, said bowed portions bearing against the inner surface of said grooves whereby the spring pressure of said bowed portions against said grooves force said reverse lips into said shell openings and said first named lips maintain said cover securely in place.

KARL M. FEIERTAG.

REFERENCES CITED

The following references are of record in the file of this patent:

UNITED STATES PATENTS

| Number | Name | Date |
| --- | --- | --- |
| Re. 22,882 | Popp | May 20, 1947 |
| 432,315 | Lisk | July 15, 1890 |
| 1,400,085 | McConnell | Dec. 13, 1921 |